United States Patent Office 2,843,586
Patented July 15, 1958

2,843,586

ESTERS OF 2-METHYL-1,3-OXAZOLIDINE-3-PHOSPHONIC ACIDS AND OF 2-METHYL-TETRAHYDRO-1,3-OXAZINE-3-PHOSPHONIC ACIDS, AND THEIR PREPARATION

Sidney Melamed, Philadelphia, Pa., assignor to Rohm & Haas Company, Philadelphia, Pa., a corporation of Delaware No Drawing. Application October 29, 1954
Serial No. 465,719

11 Claims. (Cl. 260—244)

This invention relates to esters of 2-methyl-1,3-oxazolidine-3-phosphonic acids and of 2-methyl-tetrahydro-1,3-oxazine-3-phosphonic acids, and their preparation.

It is an object of the present invention to provide new compounds having valuable properties which are adapted to serve a number of uses. An ancillary object is to provide methods for making the compounds. Other objects and advantages will appear from the description hereinafter.

The new compounds of the present invention have the structure of Formula I:

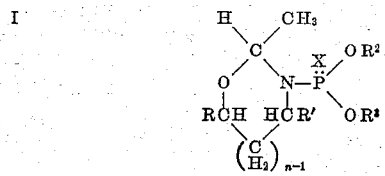

where $n$ is an integer having a value of 1 or 2, X is oxygen or sulfur, R is hydrogen, an alkyl group of 1 to 16 carbon atoms, cyclohexyl, vinyl or phenyl, R' is hydrogen, methyl or ethyl, $R^2$ and $R^3$ (1) are separate groups selected individually from the class consisting of alkyl (including cyclohexyl) or alkenyl groups of 1 to 18 carbon atoms, aryl, haloaryl, alkaryl, or aralkyl groups of 6 to 20 carbon atoms, or (2) together form a single saturated alkylene group of 2 to 3 carbon atoms forming with the —O—P—O— linkage a 5- or 6-sided heterocyclic ring.

$R^2$ and $R^3$ are preferably the same when they are separate groups but they may be different within the limits of the above definition.

Preferred compounds are those in which X is oxygen, R and R' are hydrogen and $R^2$ and $R^3$ are lower alkyl groups having 1 to 4 carbon atoms, phenyl or chlorophenyl.

While the compounds of this invention may be prepared by the reaction of 2-methyl-1,3-oxazolidines or 2-methyl-tetrahydro-1,3-oxazines with disubstituted halogeno-phosphates, such as chlorophosphates or chlorothiophosphates of the Formula II hereinafter, these procedures give poor yields and the products require extensive purification apparently because of the instability of the initial 2-methyloxazolidines and 2-methyl-tetrahydrooxazines and their tendency to tautomerize. These initial compounds containing a secondary nitrogen atom are as a class difficult to prepare, unstable and tautomeric. In general, 2-methyloxazolidines and their 2-methyl-tetrahydrooxazine analogs exist as mixtures in varying proportions of the indicated compounds and their tautomeric Schiff base isomers. These conditions are illustrated by 2-methyloxazolidine itself which is obtained in poor yield by reacting ethanolamine with acetaldehyde, resinifies on standing, and exists in the following equilibrium:

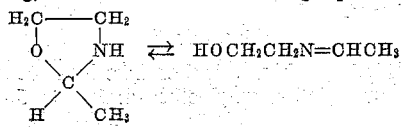

The unsubstituted oxazolidine and the unsubstituted tetrahydrooxazine analog are too unstable to be isolated.

The compounds of this invention are, however, stable compounds. The methyl group in the 2-position apparently contributes to a surprising extent to the stability of the new compounds. Nevertheless, the new compounds are highly reactive under suitable conditions as will be pointed out more particularly hereinafter.

The present invention also provides a process for producing the new esters, in which the isolation and reaction with a 2-methyl-oxazolidine or a 2-methyl-tetrahydro-1,3-oxazine are avoided. This process produces the new compounds in high yields.

The compounds of this invention are accordingly preferably prepared by the reaction of a disubstituted halogeno-phosphate or halogeno-thiophosphate of Formula II:

II

in which Y is chlorine, bromine or fluorine with a vinyloxyalkylamine of the Formula III.

III    $CH_2=CHOCH(R)(CH_2)_{n-1}CH(R')NH_2$ in which the symbols have the same definitions as given above.

Surprisingly it has been found that the reaction of one of the phosphates or thiophosphates of Formula II with one of the essentially linear vinyloxyalkylamines of Formula III leads directly to the production of the new cyclic products of this invention. It cannot have been predicted from the known reactions of such compounds that cyclic products would result from the process just described. This process produces the new compounds in high yields from readily available raw materials.

The compounds of this invention are characterized by having methyl in the 2-position of the heterocyclic ring, and at least one hydrogen in the 4-position of said ring.

The conditions of the reactions for the preparation of the compounds of this invention may vary widely. The temperature may be in the range of —10° C. to 100° C. or more. The reaction is effected in the presence of a basic acceptor for the hydrogen chloride liberated which may be excess of the amine reactant, a tertiary organic amine such as pyridine, triethylamine or benzyldimethylamine, or, preferably, an inorganic base such as sodium hydroxide, potassium hydroxide, sodium or potassium carbonate, lithium hydroxide or carbonate or the like. Should a disubstituted fluoro- or bromophosphate or fluoro- or bromothiophosphate be used, the same acceptors are employed for the hydrogen fluoride or hydrogen bromide evolved. The reaction is usually effected in an inert solvent such as benzene, toluene, ether, dioxane, acetonitrile or petroleum ether, often in a mixture of such a solvent and water but may be effected without a solvent if desired. The chlorophosphate or chlorothiophosphate is usually added to the amine; however, in certain cases the order of addition may be reversed or both reactants may be added together. The time of reaction varies from one to twenty-four hours or more, though in general, a reaction time of one to four hours is sufficient.

The amines of Formula III that may be used in the operation of this invention are readily obtained from the reaction of acetylene at pressures of 100 to 200 lbs./sq. in. gage with an aminoalcohol of Formula IV:

IV    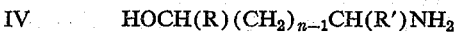

where the symbols have the definitions given above in the presence of a strong base, such as potassium, by the general procedure described by Reppe. Representative of amines of Formula III that may be used are:

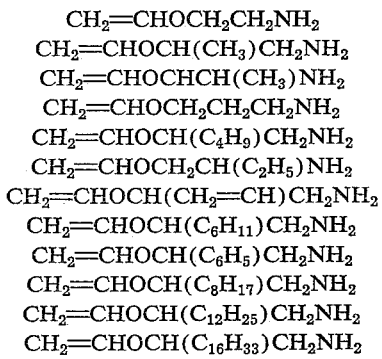

Compounds of Formula II that may be used in the practice of this invention are disubstituted chloro-, bromo-, or fluoro-phosphates or thiophosphates where the $R^2$ and $R^3$ substituents may be dimethyl, diethyl, dibutyl, diisobutyl, di-2-ethylhexyl, didodecyl, dioctadecyl, ethylene, trimethylene, propylene, dicyclopentyl, dicyclohexyl, diallyl, dioctadecenyl, di-11-undecenyl, dibenzyl, di-butylbenzyl, di-octylbenzyl, di-alpha-methyl benzyl, di-(p-chlorobenzyl), di-phenethyl, diphenyl, di-(p-chlorophenyl), di-(2,4-dichlorophenyl), di-(o-bromophenyl), di-(p-nitrophenyl), di-alpha-naphthyl, di-tolyl, di-butylphenyl, di-t-butylphenyl, di-t-octylphenyl, di-nonylphenyl, di-(dodecylmethylbenzyl), di-dodecylphenyl, or di-(p-phenylphenyl).

The compounds of this invention range from mobile oils through waxes to solids. They are useful as pesticides, corrosion inhibitors, antioxidants, plasticizers, flame-proofing materials, and constituents of extreme pressure lubricants.

The heterocyclic portions of the compounds of this invention impart valuable and unexpected properties. They impart particular solubility relationships varying widely dependent upon the substituent groups. They are reactive in the presence of acid, leading to coupling reactions with other resins and substrates such as cellulose, rayon, wood, paper, and other natural and synthetic polymeric materials. They impart special and unpredictable degrees of physiological activity in both plants and animals. They are also active in other ways too numerous to mention, depending on surrounding conditions or environment.

In the following examples, which are illustrative of the invention, the parts given are by weight unless otherwise specifically stated.

*Example 1*

Diethyl chlorophosphate, 86 g. (0.5 mole), is added slowly with stirring to a solution of 87 g. (1.0 mole) of 2-aminoethyl vinyl ether in 250 ml. of benzene cooled to 0 to 5° C. The addition is carried on through 1½ hours, and the mixture is then stirred an additional hour. The amine hydrochloride precipitates and is removed by filtration with the help of celite, a filter-aid. The filtrate is washed with cold salt water, dried with anhydrous magnesium sulfate and concentrated by stripping at reduced pressure at room temperature. The product is dark red and has an odor of acetaldehyde. It contains 6.2% nitrogen and 13.2% phosphorus. The theoretical values for the diethyl ester of 2-methyl-1,3-oxazolidine-3-phosphonic acid are 6.02% nitrogen and 13.9% phosphorus. This procedure tends to leave small amounts of the amine hydrochloride as an impurity in the product. The last traces of this impurity is difficult to remove and, unless removed, it apparently contributes a slight degree of instability to the product. The procedure of Example 2 which employs an inorganic base as the hydrogen chloride acceptor avoids this difficulty and the product obtained has far greater purity and good stability.

*Example 2*

Diethylchlorophosphate, 86 g. (0.5 mole), is added slowly with stirring to a mixture composed of potassium carbonate, 35 g. (0.25 mole), water, 35 g.; toluene, 150 ml. and 2-aminoethyl vinyl ether, 44 g. (0.5 mole) at −5 to +5° C. The reaction mixture is agitated for several hours at 0 to 5° C. after the addition is completed, and it is then filtered. The organic layer is dried with anhydrous magnesium sulfate; the drying agent is removed and the liquid concentrated by stripping at reduced pressure to give 87.5 g. of light red product containing 6.3% nitrogen and 13.7% phosphorus corresponding closely to the diethyl ester of 2-methyl-1,3-oxazolidine-3-phosphonic acid of the Formula V:

V 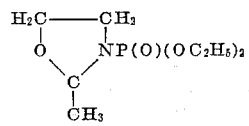

This material is useful to impart flame-resistance to cellulosic materials, such as cotton, wood, viscose and rayon. Cotton fabric padded so as to retain 10% by weight of the product described above has reduced flammability and does not support combustion.

*Example 3*

By the procedure of Example 2 and replacing the 2-aminoethyl vinyl ether entirely with 0.5 mole of 3-aminopropyl vinyl ether, there is obtained a related product; namely, the diethyl ester of 2-methyltetrahydro-1,3,oxazine-3-phosphonic acid of the structure of Formula VI:

VI 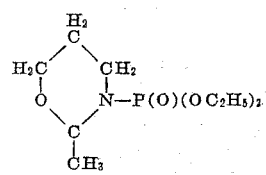

*Example 4*

(a) There is condensed one mole of dimethyl chlorophosphate and one mole of 2-aminobutyl vinyl ether by the procedure of Example 2. The product, isolated as a reddish oil, has the structure corresponding to the diethyl ester of 2-methyl-4-ethyl-1,3-oxazolidine-3-phosphonic acid.

(b) In place of the 2-aminobutyl vinyl ether of part (a) there is wholly substituted 2-amino-1-hexadecylethyl vinyl ether and the condensation effected in the same manner. There is thus obtained an amber-colored waxy solid that is soluble in petroleum oils. When added to such oils in amounts of from 0.5 to 2%, the product, namely the diethyl ester of 2-methyl-5-hexadecyl-1,3-oxazolidine-3-phosphonic acid improves the resistance of such oils to oxidative degradation.

(c) By the procedure of Example 2, there is condensed dicyclohexyl chlorophosphate and 1-phenyl-2-aminoethyl vinyl ether in equimolar amounts at 30° to 40° C. to give the dicyclohexyl ester of 2-methyl-5-phenyl-1,3-oxazolidine-3-phosphonic acid. This material is useful as an oxidation inhibitor for lubricating oils.

*Example 5*

Diallyl chlorophosphate and 1-vinyl-2-aminoethyl vinyl ether are condensed at −10 to 0° C. by the procedure of Example 2 to give the diallyl ester of 2-methyl-5-vinyl-1,3-oxazolidine-3-phosphonic acid.

This material is mixed with 5% by weight of di-tert-butyl peroxide and heated at 130° C. for six to ten hours. The resultant casting is transparent, hard and flame-resistant.

*Example 6*

(a) Didodecyl chlorothiophosphate is condensed with 2-amino-1-methylethyl vinyl ether at 30° to 50° C. by the procedure of Example 2 to give the di-(dodecyl) ester of 2,5-dimethyl-1,3-oxazolidine-3-thiophosphonic acid. This material is useful as an antioxidant when added to cutting oils at 0.1 to 2.0% by weight.

(b) In the same way, dioctadecenyl chlorophosphate is condensed with 2-amino-1-cyclohexyl-ethyl vinyl ether. The product, the dioctadecenyl ester of 2-methyl-5-cyclohexyl-1,3-oxazolidine-3-phosphonic acid, is also a useful additive to cutting as well as lubricating oils.

(c) The di-(11-undecenyl) ester of 2-methyl-6-hexadecyltetrahydro-1,3-oxazine-3-phosphonic acid obtained in the same way by the reaction of the di-(11-undecenyl) chlorophosphate with 3-amino-1-hexadecyl-propyl vinyl ether has similar properties making it a useful additive for cutting oils.

*Example 7*

(a) Di-p-chlorophenyl chlorothiophosphate is condensed with 3-aminopropyl vinyl ether at 50° to 80° C. by the procedure of Example 2 to give the di-(p-chlorophenyl) ester of 2-methyl-3-tetrahydro-1,3-oxazine-3-thiophosphonic acid.

This material is useful as a contact insecticide against bean aphids at from 3 to 8 lbs./100 gallons of spray.

The compound is compatible with polyvinyl chloride resins and may be added in amounts of 10 to 30% to improve flexibility and increase stability.

(b) In the same way, di-(p-chlorophenyl)-chlorothiophosphate is condensed with 3-amino-3-methyl-propyl vinyl ether. The product, the di-(p-chlorophenyl) ester of 2,6-dimethyl-tetrahydro-1,3-oxazine-3-thiophosphonic acid, is also valuable as an insecticide.

*Example 8*

(a) Dibenzyl chlorophosphate is condensed with 2-aminoethyl vinyl ether to give the dibenzyl ester of 2-methyl-1,3-oxazolidine-3-phosphonic acid.

(b) By the procedure of Example 2, di-(dodecylmethylbenzyl) chlorophosphate and 1-butyl-2-aminoethyl vinyl ether are condensed at 50° to 100° C. to give the di-(dodecylmethylbenzyl) ester of 2-methyl-5-butyl-1,3-oxazolidine-3-phosphonic acid.

(c) One mole of diphenyl chlorophosphate and one mole of 2-aminoethyl vinyl ether, are condensed by the method of Example 2 in the presence of 0.6 mole of sodium carbonate to give the diphenyl ester of 2-methyl-1,3-oxazolidine-3-phosphonic acid.

This product is useful as a plasticizer in amounts of 20% to 40% for polyvinyl chloride resins and imparts good low temperature flexibility and resistance to ageing. The corresponding ditolyl ester is also useful in this application.

(d) In the same way as in part (c) hereof, one mole of diphenyl chlorophosphate and one mole of 2-amino-1-vinyl-ethyl vinyl ether are condensed to form the diphenyl ester of 2-methyl-5-vinyl-1,3-oxazolidine-3-phosphonic acid. It may be used as a plasticizer or it may be copolymerized with other ethylenically unsaturated comonomers, such as ethyl acrylate.

*Example 9*

O,O-ethylene chlorophosphate and 3-aminopropyl vinyl ether are condensed at 0° to 5° C., by the procedure of Example 2 to give the product of the following structure (Formula VII):

VII
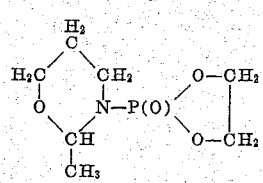

This compound is useful as a flame-proofing agent for cotton fabrics and other cellulosic materials.

The product of Example 9 as well as the products of Examples 2 and 3 are each particularly useful as co-reactants with water-soluble condensation resins such as urea-formaldehyde, melamine-formaldehyde, phenol-formaldehyde and the like. Admixed with such condensation resins in amounts of 50 to 90% and catalyzed with acetic substances, such as sulfuric acid, ammonium chloride, ethanolamine hydrochloride and the like, the amidophosphates of Examples 2, 3, or 9 can be used to treat paper, wood, textiles and other materials to give durable, flame-proof coatings, finishes or impregnates.

It is to be understood that changes and variations may be made without departing from the spirit and scope of the invention as defined in the appended claims.

I claim:

1. A composition having the structure of the formula

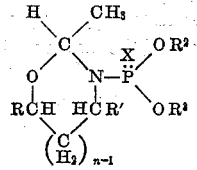

where n is an integer having a value of 1 to 2, X is selected from the group consisting of oxygen and sulfur, R is selected from the group consisting of hydrogen, cyclohexyl, vinyl, phenyl, and alkyl groups of 1 to 16 carbon atoms, R' is selected from the group consisting of hydrogen, methyl, and ethyl, $R^2$ and $R^3$ are selected from the group consisting of (1) separate groups selected individually from the class consisting of cyclohexyl; alkyl and alkenyl groups of 1 to 18 carbon atoms; phenyl, halophenyl, benzyl, and alkyl benzyl groups of 6 to 20 carbon atoms, and (2) a single saturated alkylene group of 2 to 3 carbon atoms forming with the —O—P—O— linkage a 5-to-6-sided heterocyclic ring.

2. A compound of the formula

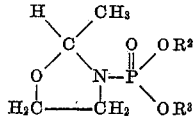

where $R^2$ and $R^3$ are alkyl groups having 1 to 18 carbon atoms.

3. A compound of the formula

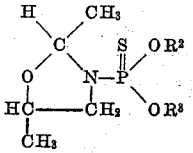

where $R^2$ and $R^3$ are alkyl groups having 1 to 18 carbon atoms.

4. A compound of the formula

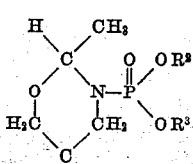

where $R^2$ and $R^3$ are alkyl groups having 1 to 18 carbon atoms.

5. The diethyl ester of 2-methyl-1,3-oxazolidine-3-phosphonic acid.

6. The diethyl ester of 2-methyl-tetrahydro-1,3-oxazine-3-phosphonic acid.

7. The diphenyl ester of 2-methyl-1,3-oxazolidine-3-phosphonic acid.

8. The di-cyclohexyl ester of 2-methyl-5-phenyl-1,3-oxazolidine-3-phosphonic acid.

9. The di-dodecyl ester of 2,5-dimethyl-1,3-oxazolidine-3-thiophosphonic acid.

10. A method comprising reacting a compound of the formula

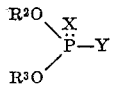

where $R^2$, $R^3$, and X are as defined in claim 1, and Y is selected from the group consisting of chlorine, bromine, and fluorine, with a vinyloxyalkylamine having the structure of the formula $$CH_2=CHOCH(R)(CH_2)_{n-1}CH(R')NH_2$$

where R, R', and n are as defined in claim 1, to produce a reaction product having the structure of the formula defined in claim 1.

11. A method as defined in claim 10 in which the reaction is effected at $-10°$ C. to $100°$ C. in the presence of a basic acceptor for the halogen halide liberated.

References Cited in the file of this patent

UNITED STATES PATENTS

| | | |
|---|---|---|
| 2,027,031 | Engelmann | Jan. 7, 1936 |
| 2,418,224 | Georges | Apr. 1, 1947 |
| 2,442,582 | Bishop | June 1, 1948 |
| 2,520,150 | Kropa et al. | Aug. 29, 1950 |
| 2,569,428 | Rowland | Sept. 25, 1951 |
| 2,687,389 | Dazzi | Aug. 24, 1954 |
| 2,706,194 | Morris et al. | Apr. 12, 1955 |

OTHER REFERENCES

Audrieth et al.: J. Am. Chem. Soc., vol. 64, pp. 1337–9 (1942).

Saunders et al.: J. Chem. Soc. (London), vol. 1948, p. 702.